United States Patent
Huang et al.

(10) Patent No.: US 9,489,225 B2
(45) Date of Patent: Nov. 8, 2016

(54) ALLOCATING RESOURCES FOR MULTI-PHASE, DISTRIBUTED COMPUTING JOBS

(71) Applicant: Cisco Technology, Inc., San Jose, CA (US)

(72) Inventors: Senhua Huang, Fremont, CA (US); Debojyoti Dutta, Santa Clara, CA (US); Madhav Marathe, Cupertino, CA (US); Raghunath Nambiar, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 14/156,149

(22) Filed: Jan. 15, 2014

(65) Prior Publication Data

US 2015/0199208 A1    Jul. 16, 2015

(51) Int. Cl.
  *G06F 17/30* (2006.01)
  *G06F 9/455* (2006.01)
  *G06F 9/46* (2006.01)
  *G06F 9/50* (2006.01)
  *G06F 9/445* (2006.01)

(52) U.S. Cl.
  CPC ....... *G06F 9/45533* (2013.01); *G06F 9/44505* (2013.01); *G06F 9/5005* (2013.01)

(58) Field of Classification Search
  CPC ............... G06F 9/45558; G06F 9/455; G06F 9/45533; G06F 21/31; G06F 9/5005; G06F 9/44505; G06F 9/5066; G06F 9/4843; G06F 2209/5011; G06F 2209/5022
  See application file for complete search history.

(56) References Cited

U.S. PATENT DOCUMENTS

| | | | |
|---|---|---|---|
| 6,798,743 B1 | 9/2004 | Ma et al. | |
| 7,228,337 B1 | 6/2007 | Bornstein et al. | |
| 8,572,575 B2* | 10/2013 | Berlyant | G06F 9/5066 717/126 |
| 8,954,967 B2* | 2/2015 | Balmin | G06F 9/5066 718/100 |
| 9,170,848 B1* | 10/2015 | Goldman | G06F 9/5066 |
| 9,256,460 B2* | 2/2016 | Jacobson | G06F 9/461 |
| 9,268,597 B2* | 2/2016 | Bradshaw | G06F 9/466 |
| 2004/0044718 A1* | 3/2004 | Ferstl et al. | 709/200 |
| 2010/0275199 A1 | 10/2010 | Smith et al. | |
| 2011/0276962 A1* | 11/2011 | Chambers | G06F 9/445 718/1 |
| 2012/0317579 A1* | 12/2012 | Liu | 718/104 |
| 2013/0086272 A1* | 4/2013 | Chen | G06F 9/4856 709/226 |
| 2013/0318521 A1 | 11/2013 | Monaghan et al. | |

(Continued)

OTHER PUBLICATIONS

Fisk et al., FileMap: map-reduce program execution on loosely-coupled distributed systems, Apr. 2014, 6 pages.*

(Continued)

*Primary Examiner* — Thuy Dao
(74) *Attorney, Agent, or Firm* — Parker Ibrahim & Berg LLC; James M. Behmke; Stephen D. LeBarron (57) ABSTRACT

In one embodiment, data indicative of the size of an intermediate data set generated by a first resource device is received at a computing device. The intermediate data set is associated with a virtual machine to process the intermediate data set. A virtual machine configuration is determined based on the size of the intermediate data set. A second resource device is selected to execute the virtual machine based on the virtual machine configuration and on an available bandwidth between the first and second resource devices. The virtual machine is then assigned to the second resource device to process the intermediate data set.

16 Claims, 7 Drawing Sheets

(56) References Cited

U.S. PATENT DOCUMENTS

2013/0318525 A1* 11/2013 Palanisamy ........... G06F 9/5066
  718/1
2014/0075047 A1   3/2014 Narasimhan et al.
2015/0067680 A1*  3/2015 Phelan et al. .................. 718/1
2015/0370603 A1* 12/2015 Fuller ................... G06F 9/5011
  718/104

OTHER PUBLICATIONS

Palanisamy et al., Purlieus: locality-aware resource allocation for MapReduce in a cloud, Nov. 2011, 11 pages.*

Lama et al., AROMA: automated resource allocation and configuration of mapreduce environment in the cloud, Sep. 2012, 10 pages.*

"Auto Scaling", AWS Products and Solutions, webpage: http://aws.amazon.com/autoscaling/, (2013), 3 pages, printed Feb. 17, 2014, Amazon Web Services, Inc.

Polo, et al., "Adaptive Scheduler—MAPREDUCER-1380", Hadoop Map/Reduce, web page https://issues.apache.org/jira/i#browse/MAPREDUCER-1380, created Jan. 2010, printed Feb. 13, 2014, 3 pages, The Apache Software Foundation, www.apache.org.

Polo, et al., "Resource-Aware Adaptive Scheduler for Hadoop MapReduce", Feb. 2011, 4 pages, The Apache Software Foundation, www.apache.org.

* cited by examiner

| RESOURCE DEVICE 602 | AVAILABLE SOURCE DESTINATION BANDWIDTH 604 | TASK ELIGIBLE? 606 |
|---|---|---|
| Z | 2 GB / s | NO |
| A | 1 GB / s | YES |
| ... | ... | ... |

610 { (row Z)
612 { (row A)

ALLOCATING RESOURCES FOR MULTI-PHASE, DISTRIBUTED COMPUTING JOBS

TECHNICAL FIELD

The present disclosure relates generally to cloud computing systems, and, more particularly, to allocating resources for multi-phase, distributed computing jobs in a cloud environment.

BACKGROUND

Generally, the "cloud" refers to computing resources, such as software, services, and information, connected via a network, e.g., the Internet. "Cloud computing" can thus be defined as Internet-based computing in which these computing resources are dynamically provisioned and allocated to client or user computers or other devices on-demand from a pool of resources available via the cloud. Cloud computing is envisioned as a way to allocate access to these resources according to particular needs of a user.

Allocating access to resources in a cloud computing environment presents various challenges. For example, there is an ever increasing number of computing resources within the cloud possessing an ever increasing variety of capabilities and attributes, and, further, there are an ever increasing number of users having various computing needs. Selecting particular resources for a given task is thus a complex problem. These challenges are particularly enhanced for distributed computing jobs having multiple phases, where the resources needed for subsequent phases of processing are typically unknown at the start of the job.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, data indicative of the size of an intermediate data set generated by a first resource device is received at a computing device. The intermediate data set is associated with a virtual machine (VM) to process the intermediate data set. A VM configuration is determined based on the size of the intermediate data set. A second resource device is selected to execute the VM based on the VM configuration and on an available bandwidth between the first and second resource devices. The VM is then assigned to the second resource device to process the intermediate data set.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
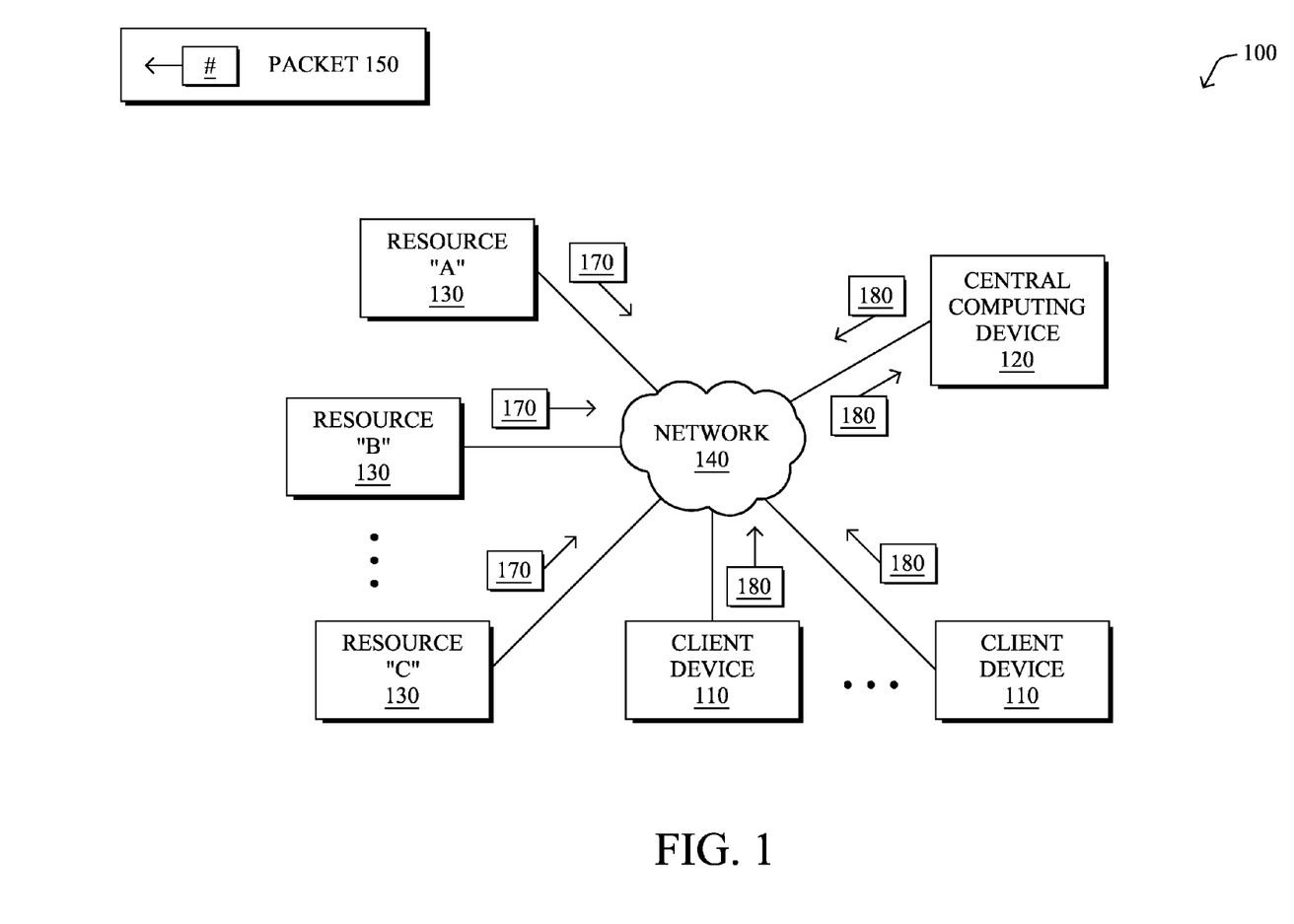
FIG. 1 illustrates an example communication network.

For example, FIG. 1 illustrates an example computer network 100 illustratively comprising a plurality of devices, such as a client device(s) 110, a centralized computing device (e.g., a server, a head-end application device, a network management server or "NMS," etc.) 120, and a plurality of other devices 130 (e.g., "A," "B," "C," etc.), generally referred to as "resources" herein. Generally, the client device 110, computing device 120, and the plurality of resource devices 130 may be interconnected by a network 140, for example, WANs (e.g., the Internet), LANs, etc., through various methods of communication, such as wired and/or wireless links. Those skilled in the art will understand that any number of computing resources, devices, links, etc. may be used in network 100, and that the view shown herein is for simplicity.

Data packets 150 (e.g., attribute information 170 and/or requests 180 and responses 185, as described below) may be exchanged among the nodes/devices of the computer network 100 using predefined network communication protocols as will be understood by those skilled in the art. In this context, a protocol consists of a set of rules defining how the nodes interact with each other.

Figure 2:
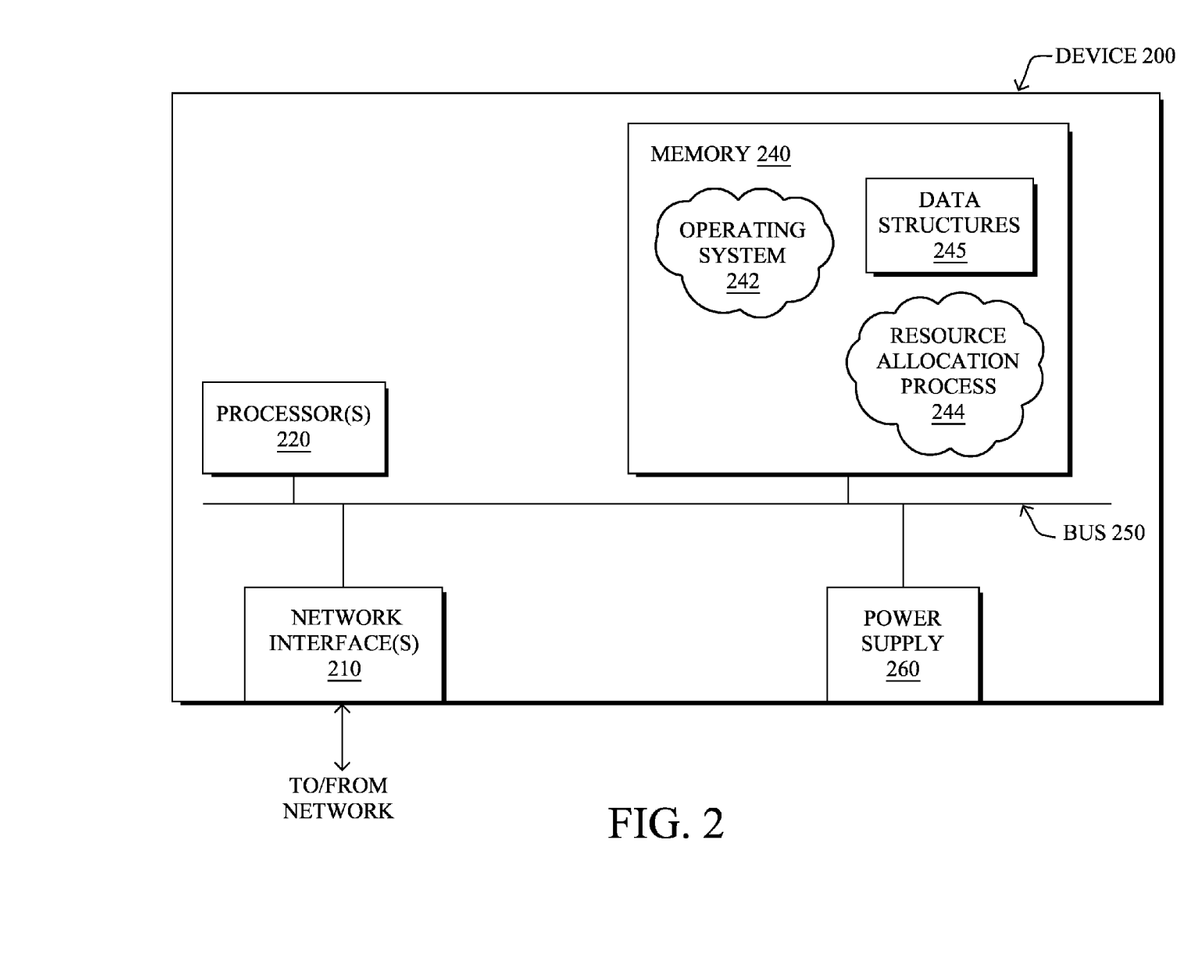
FIG. 2 illustrates an example network device/node.

FIG. 2 is a schematic block diagram of an example computing device 200 that may be used with one or more embodiments described herein, e.g., particularly as computing device 120 or in certain embodiments client device(s) 110 (e.g., for client-side operation of the techniques herein). The device 200 may comprise one or more network interfaces 210, at least one processor 220, and a memory 240 interconnected by a system bus 250. Network interface(s) 210 contain the mechanical, electrical, and signaling circuitry for communicating data over links coupled to network 100. The network interfaces 210 may be configured to transmit and/or receive data using a variety of different communication protocols, as will be understood by those skilled in the art.

The memory 240 comprises a plurality of storage locations that are addressable by processor 220 for storing software programs and data structures associated with the embodiments described herein. The processor 220 may comprise necessary elements or logic adapted to execute the software programs and manipulate data structures 245. Operating systems 242, portions of which are typically resident in memory 240 and executed by the processor, functionally organizes the device by, inter alia, invoking operations in support of software processes and/or services executing on the device. These software processes and/or services may comprise an illustrative "resource allocation" process/service 244, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having resource allocation process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, cloud computing can be defined as Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, VMs, edge computing devices, etc. For instance, resources may include service devices (firewalls, deep packet inspectors, traffic monitors, etc.), processing devices (brute force processing capability), storage devices (e.g., servers, network attached storages, storage area network devices), etc.

Cloud computing, in particular, is envisioned as a way to allocate access to these resources according to particular needs of a user. However, as mentioned, allocating access to these resources presents various challenges. For example, there are an ever increasing number of computing resources within the cloud possessing an ever increasing variety of capabilities and attributes, and, further, there are an ever increasing number of users having various computing needs. Selecting particular resources for a given task is thus a complex problem. For multi-phase computing jobs executed in a cloud computing environment, these challenges are enhanced since the size of intermediate data sets between phases can vary.

A simple example of a multi-phase, distributed computing job is provided by the MapReduce framework. A MapReduce job has two phases of execution: mapping and reducing. In each phase, one or more tasks are scheduled to run in parallel on different machines of the cloud computing environment. However, the reducing phase cannot begin while there are still mapping tasks running. In other words, different phases serve as the synchronization barrier so that intermediate results of previous phases can be shuffled and transferred to the nodes that execute the next phase operations.

The amount of intermediate data that needs to be transferred between MapReduce phases is often not determined beforehand. Depending on the algorithm used, each node that executes the next phase task might get an uneven split of intermediate data to process. The time spent on each phase (and thus the total job completion time) is often determined by the slowest node that might handle the majority of the data. Therefore, a skewed distribution of the key-value pairs of the intermediate results will greatly impact the performance of the application. In a multi-tenant environment, the effect is worse due to the lack of guarantee on the actual available resources in the compute nodes. On the other hand, with virtualization techniques, better performance isolation can be achieved by assigning one VM to only one tenant or application. However, the problem of unbalanced load for the next phase execution is still a problem since there is currently no easy way to adjust the resource allocation.

One attempt to solve the issue of allocating resources to process intermediate data in a multi-phase computing job is to assign a completion deadline to the job. For example, the adaptive Hadoop scheduler (MAPREDUCE-1380) available at https://issues.apache.org/jira/browse/MAPREDUCE-1380 assigns a completion deadline to a given job. This deadline is then used by the scheduler to dynamically adjust the priority of the tasks based on a predicted job completion time. However, this technique is reactive in nature, i.e., it only attempts to make adjustments if the job is predicted to take longer than the assigned completion deadline.

Thus far, existing resource allocation techniques for a multi-phase computing job have been reactive in nature and make no attempt to optimize the allocation of resources based on the intermediate data generated by a previous step. Further, existing resource allocation techniques have also failed to take into account network resources, which can impact the time at which a task can begin processing intermediate data from a prior phase.

The techniques herein, on the other hand, enable a resource allocation process (e.g., a task scheduler) to choose the optimal VM instance size and optimal placement of VMs for the next computation phase based on the amount of data that need to ship to and process at each VM for the next phase computation. In other words, the allocation process may attempt at the end of each execution phase of the computing job to: 1.) determine the computing resources required for each task in the next phase, and 2.) determine an optimized assignment of the tasks to resource devices based in part on the network resource of the cloud computing environment. That is, a framework is defined for resource selection in a multi-phase computing job where such resources are selected based on both the size of the intermediate data generated in the prior phase and on the network bandwidth between the resource devices processing the different phases.

Specifically, according to one or more embodiments of the disclosure as described in further detail below, data indicative of the size of an intermediate data set generated by a first resource device is received at a computing device. The intermediate data set is associated with a VM to process the intermediate data set. A VM configuration is determined based on the size of the intermediate data set. A second resource device is selected to execute the virtual machine based on the VM configuration and on an available bandwidth between the first and second resource devices. The selected VM is then assigned to the second resource device to process the intermediate data set.

Illustratively, the techniques described herein may be performed by hardware, software, and/or firmware, such as in accordance with the resource allocation process 244, which may contain computer executable instructions executed by the processor 220 to perform functions relating to the techniques described herein.

Operationally, the resource allocation process 244, or, more generally, the device 200, e.g., computing device 120, first gathers information that represents the capability attributes or "resource properties" of resource devices within the network 100. This information may be represented, for example, by attribute information 170 sent from resource devices 130 in the network 100 and received by computing device 120, as depicted in FIG. 1. Notably, the information representing the capability attributes of devices in the data center may be received in real-time, i.e., as the capability attributes for a device changes, the device sends information representing the latest/updated capability attribute. A variety of techniques may be employed for the reception of this attribute information 170 containing capability attributes of resources, such as publish-subscribe, polling/querying, etc.

For example, resources such as server resources, as well as the access switches, routers, firewall devices, load balancers, storage devices, etc. in the network (e.g., within one or more data centers), may send messages, e.g., attribute information 170, that contain an indication of their respective resource properties to the computing device 120. That is, each of these resources has a corresponding set of resource property values or attributes that are useful for purposes of management and provisioning service requests in a manner that is optimal to both the requestor, e.g., client device 110 (such as a customer), and a cloud service provider. As an example, these property values or capability attributes can include any one or more of the following: a central processing unit (CPU) count, a CPU speed, processor unit utilization, an available memory, hypervisor type, power consumption; amount of local storage availability, average load, a number of VM resources, number of load balancers, outgoing/downlink bandwidth, an incoming/uplink bandwidth, an average incoming delay, an average outgoing delay, a communication jitter metric, a longitude and latitude, etc. Notably, the set of particular attributes/properties discovered may vary over time, depending upon configuration and/or device capabilities.

Attribute information 170 may also include data regarding the status of tasks distributed to resource devices as part of a multi-phase computing job. In particular, attribute information 170 may include data indicative of the size of an intermediate data set generated during one of the phases of the overall computing job. For example, if the multi-phase computing job is a MapReduce process, attribute information 170 may include the number of key-value pairs generated by the mapping tasks distributed to the various resource devices in the network as part of the mapping phase of the job. In another example, attribute information 170 may include the amount of memory used to store an intermediate data set.

In one embodiment, attribute information 170 includes data regarding the network connecting the resource devices available to a multi-phase computing job. Such network resource data may include, for example, data regarding the network topology of the cloud computing environment (e.g., how the resource devices are interconnected) and the throughput capabilities of the network connections between the resource devices. For example, attribute information 170 may include information regarding the total possible connection bandwidth between two resource devices. Attribute information 170 may also include data regarding the available network bandwidth between two resource devices. The total possible bandwidth and available bandwidth between two resource devices may differ, for example, if other tasks outside of the computing job also pass data between the two resource devices.

Figure 3:
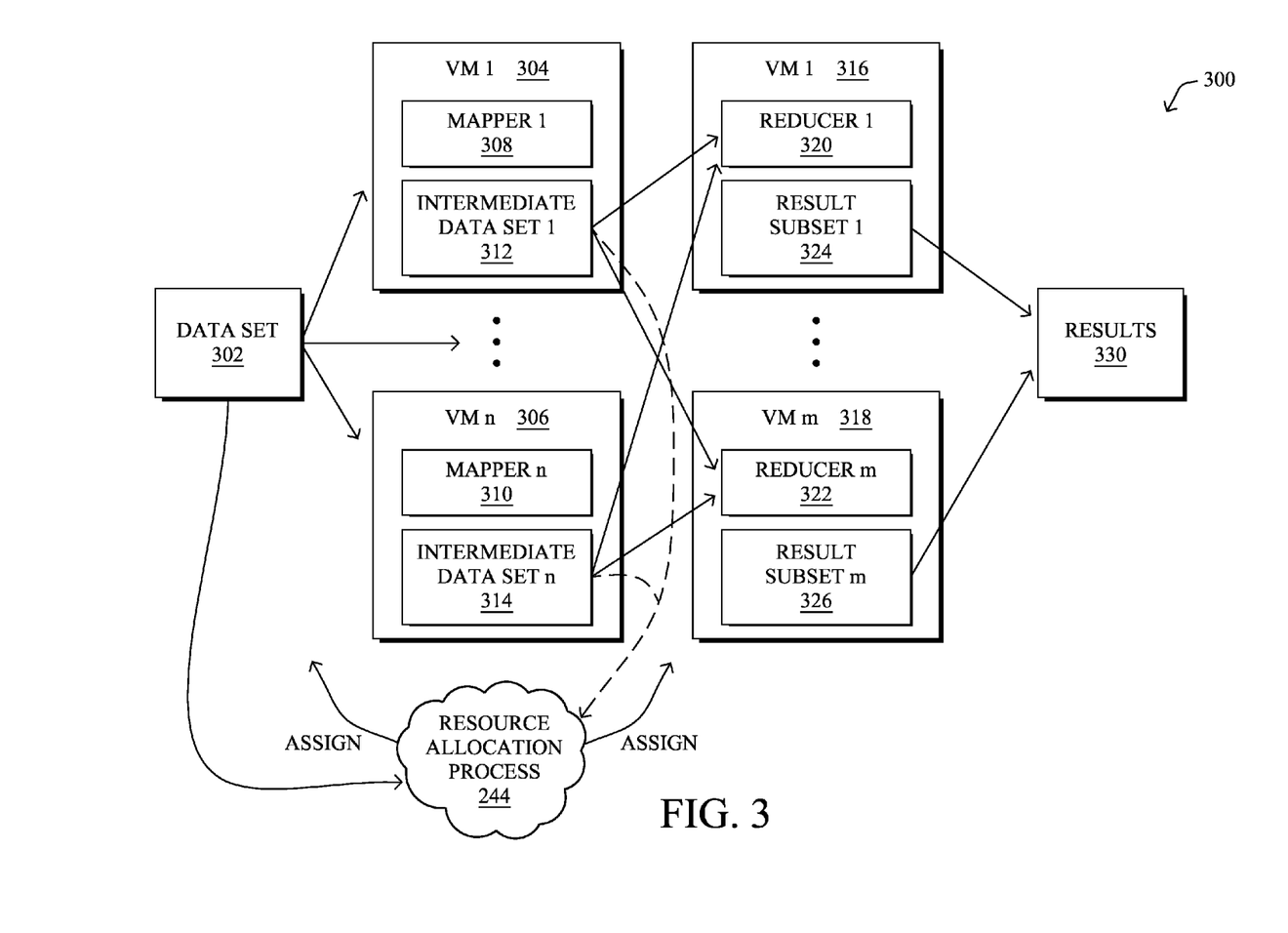
FIG. 3 illustrates an example multi-phase computing job.

Upon receiving the attribute information 170 from resource devices 130, the resource allocation process 244 of the central computing device 120 may then use this information to assign the tasks for the next phase of processing to other resource devices 130. For example, as shown in FIG. 3, resource allocation process 244 may receive data regarding the size of intermediate data sets generated in parallel by resource devices 130 in the cloud computing environment as part of a multi-phase, distributed computing job 300. For illustrative purposes only, resource allocation process 244 is shown to allocate resources as part of a MapReduce process, which includes a mapping phase and a reducing phase. However, those skilled in the art will appreciate that the functionality described herein may be used to allocate resources in any type of multi-phase, distributed computing job having any number of task phases.

According to the embodiments herein, resource allocation process 244 assigns tasks for each phase of computing job 300 to VMs executed by resource devices 130. Any number of VMs may be executed on a particular resource device, at any given time. For example, a particular resource device may execute multiple VMs that process data as part of computing job 300, different VMs assigned to different computing jobs, etc. The VMs executed by resource devices 130 may each have its own set of computing resource allocations, such as an allocated amount of physical memory and/or processing power. Thus, each VM may be treated by resource allocation process 244 as its own independent resource device, in some cases. In various embodiments, a VM may be preexisting on one of resource devices 130 at the time when resource allocation process 244 assigns a phase task to it or may cause the VM to be created as part of the task assignment.

As shown, resource allocation process 244 receives data regarding an input data set 302 for processing by computing job 300. In response, resource allocation process 244 divides the data set 302 into any number of data subsets to be processed in parallel. For example, resource allocation process 244 may divide data set 302 into n-number of data subsets to be processed by n-number of mapper tasks (e.g., a first mapper task 308 through an nth mapper task 310) executed by n-number of VMs (e.g., a first VM 304 is through an nth VM 306). In one embodiment, the maximum number of tasks/VMs available to computing job 300 at any given phase of computing job 300 may be limited. For example, the number of tasks in any given phase of computing job 300 may be limited by a user's configuration, a policy of the cloud computing environment, etc.

Mapper tasks 308-310 are configured to process the subdivided data set 302 into n-number of intermediate data sets 312-314 (e.g., a first intermediate data set 312 through an nth intermediate data set 314). As part of a MapReduce process, intermediate data sets 312-314 are key-value pairs generated by mapper tasks 308-310 from the subdivided input data set 302. For example, assume that data set 302 includes a listing of baseball teams and the number of wins each team had per year. Also, assume that computing job 300 is used to identify the maximum number of wins each team had for any given year (e.g., the best season of each team). In such a case, mapper tasks 308-310 may use the names of the teams as key values and the wins per year as values associated with the name keys. Thus, intermediate data set 312 may include a number of key-value pairs that associate a given baseball team with values that correspond to the number of wins by that team in a given year.

As part of the next phase of computing job 300, m-number of reducer tasks 320—(e.g., a first reducer task 320 through an mth reducer task 322) process intermediate data sets 312-314 to generate m-number of result subsets 324-326 (e.g., a first result subset 324 through an mth result subset 326). For example, if intermediate data sets 312-314 are of the following format: <team 1><#wins in year 1>, <team 1><#wins in year 2>, etc., reducer processes 320-322 may search through the key-value pairs to identify the greatest number of wins per team. In other words, result subsets 324-326 include only the key-value pairs that correspond to each team's maximum number of wins for any year. Result subsets 324-326 are then combined to form the final results 330. For example, final results 330 may include a listing of each baseball team, followed by the number of wins each team had in its best season.

In various embodiments, resource allocation process 244 receives data indicative of the sizes of intermediate data sets 312-314 from VMs 304-306 and uses this information to allocate reducer tasks 320-322 to VMs 316-318. In other words, resource is allocation process 244 may make reducer task assignments to minimize the maximum reducing time across all reducers. For example, resource allocation process 244 may receive data indicative of the number of bytes occupied by each of intermediate data sets 312-314, the number of key-value pairs in each of intermediate data sets 312, 314, or the like. Resource allocation process 244 may use the size information to identify which of VMs 316-318 are appropriate to execute reducer tasks 320-322. For example, assume that intermediate data set 312 is twice as large as intermediate data set 314. In such a case, resource allocation process 244 may allocate reducer task 322 to process intermediate data set 312 and reducer task 320 to process intermediate data set 314, if VM 318 has double the computational resources as that of VM 316.

In further embodiments, resource allocation process 244 may base the assignment of intermediate data sets 312-314 to reducer tasks 320-322 based on the network bandwidth between VMs 304-306 and VMs 316-318. As will be appreciated, VMs 304-306 and VMs 316-318 may or may not be instantiated on the same devices. Resource allocation process 244 may, in one embodiment, attempt to first assign a reducer task to a VM running on the same device as the VM providing the intermediate data to the reducer task (e.g., based on available computing power at the device). For example, resource allocation process 244 may first attempt to assign the largest set of intermediate data to a mapper VM located on the same device. If the same device is not capable of executing the reducer task, resource allocation process 244 may then select another device based on the computing and/or networking capacities of the other device. For example, if intermediate data set 314 is the largest intermediate data set, it may be assigned to reducer task 320 if the network connection between the devices running VM 306 and VM 316 has the highest bandwidth and VM 316 has the computational resources to process intermediate data set 314.

Figure 4:
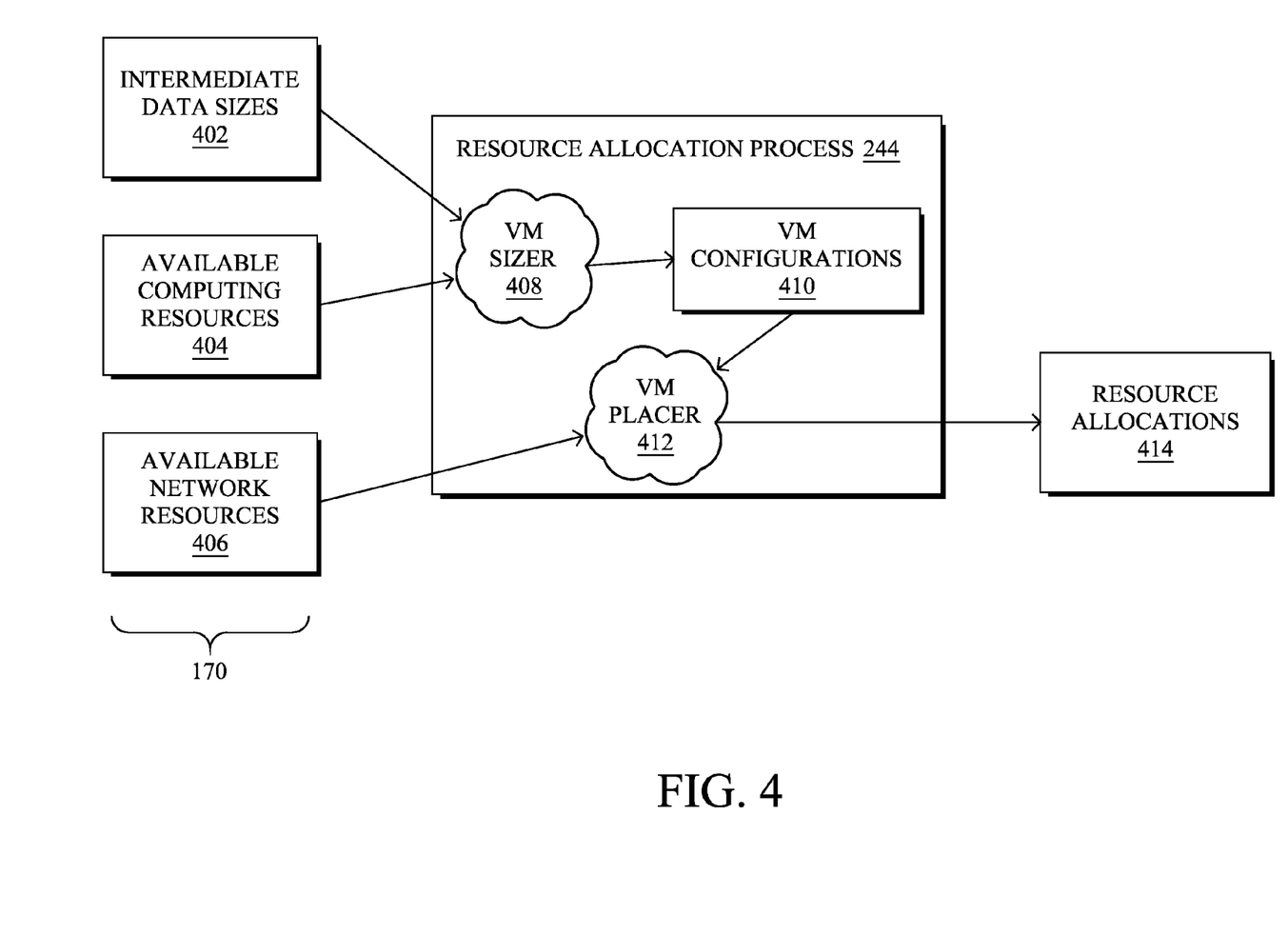
FIG. 4 illustrates an example resource allocation process for a multi-phase computing job.

Referring now to FIG. 4, resource allocation process 244 may receive attribute information 170 from the various devices in computer network 100. As shown, resource allocation process 244 may receive computing resource data 404 indicative of the available computing resources from any of resource devices 130. For example, computing resource data 404 may include data regarding the total and/or available processing operations of a particular resource device or VM, the total and/or available memory space of a particular device or VM, the amount of processing operations or memory space currently in use by a resource device or VM, etc.

Attribute information 170 may also include network resource data 406 indicative of the network connections and network resources that couple resource devices 130. For example, network resource data 406 may include data regarding how the resource devices are interconnected (e.g., the network topology), the maximum bandwidth between any two connected resource devices or VMs, the available amount of bandwidth between any two connected resource devices or VMs, how much bandwidth is currently in use between any two resource devices or VMs (e.g., the bandwidth consumed by other cloud computing processes), etc.

According to various embodiments, resource allocation process 244 also receives size data 402 indicative of the sizes of intermediate data sets generated during a phase of a distributed computing job. Size data 402 may correspond to the total amount of memory used by each intermediate data set, the number of entries in each intermediate data set, or any other measure of the size of the intermediate data sets. For example, size data 402 may include a count of the number of key-value pairs in each intermediate data set generated by mapper tasks in a MapReduce process.

Computing resource data 404, network resource data 406, and data sizes 402 may be received by resource allocation process 244 at the same time or at different times. In one embodiment, a particular resource device may report its available computing resources, network resources to neighboring devices, and the size of any intermediate data sets to resource allocation process 244 as part of a single notification. In another embodiment, resource allocation process 244 may receive data 402-404 at disparate times. For example, resource allocation process 244 may receive size data 402 from a VM immediately after its corresponding task has generated an intermediate data set and network resources associated with the VM at a different time (e.g., before the task executed by the VM completes).

In various embodiments, resource allocation process 244 uses the received attribute information 170 to generate resource allocations 414 for the next phase of processing of a multi-phase, distributed computing job. In general, resource allocations 414 correspond to instructions that cause the VMs that processed the last phase of the computing job to transfer the resulting intermediate data sets to the VMs selected to process the intermediate data sets in the current phase of the job. Thus, resource allocations 414 may include, for example, an association between an intermediate data set and a task used to process the intermediate data set in the current phase of the computing job. Resource allocations 414 may be sent to both corresponding VMs individually or at once (i.e., the notification is duplicated to both VMs). In one embodiment, resource allocations 414 also include instructions that cause the receiving resource devices to generate the VMs used to process the intermediate data sets in the current phase of the computing job, if the current-phase VMs do not yet exist on the resource devices.

To generate resource allocations 414, resource allocation process 244 may represent the indices of the tasks in a particular phase of the computing job as 1, 2, . . . , r, where r is fixed number of tasks that may be used for a given phase (e.g., based on the user's configuration, etc.). The amount of intermediate data that resource allocation process 244 needs to transfer to a $task_i$, (e.g., a reducer task) from a $task_j$ in the previous phase (e.g., a mapper task) may also be represented by resource allocation process 244 as $d_{ij}$. Thus, the processing time for $task_i$ ($PT(task_i)$) can be roughly calculated by resource allocation process 244 as:

$$PT(task_i)=\max_j\{d_{ij}/T_{ij}\}+d_i/C_i$$

where $T_{ij}$ is the available network throughput between the pair of the hosts running $task_j$ of in the previous phase and $task_i$ of the current phase, $C_i$ is the computing power that is chosen for $task_i$ by resource allocation process 244, and $d_i=sum_j\{d_{ij}\}$ is the total amount of data that need to be shipped to $task_i$ at the current phase. In some embodiments, resource allocation process 244 may treat this scheduling problem as an optimization problem in which the objective is to minimize the maximum amount of time spent across all the tasks for this phase.

Resource allocation process 244 may also add one or more constraints into the formulation of the optimization problem. For example, resource allocation process 244 may limit the amount of computing resources that can be used for each phase of the computing job. In another example, resource allocation process 244 may ensure that the total number of VMs placed on each resource device cannot exceed a particular threshold due to hard resource constraints and/or an over-subscription ratio.

Since resource allocation process 244 decides which VMs should be used for a particular task, resource allocation process 244 may treat the computing power chosen for $task_i$ ($C_i$) as an optimization variable. Another optimization variable that may be used by resource allocation process 244 includes the VMs/resource devices to which the current tasks are to be placed. Quality of service (QoS) information in network resource data 406 from both virtual switches and any intermediate switches and routers may be used by resource allocation process 244 to guarantee that a particular amount of bandwidth is reserved for a pair of resource devices in the network such that the source device is where the task for the previous phase resides and the destination device is where the task for the current phase resides. Thus, resource allocation process 244 may be configured to solve each of the following: 1) determining the VM resources needed for each of the current tasks, and 2) the placement of the VMs on the actual devices. In one embodiment, resource allocation process 244 solves both problems jointly. In another embodiment, resource allocation process 244 solves each of these problems separately.

In various embodiments, resource allocation process 244 includes a VM sizer 408 configured to determine the VM size for each task at the current phase ($C_i$) in order to minimize the maximum amount of processing time in this phase. Such information may be stored by VM sizer 408 in memory as VM configurations 410. In other words, VM sizer 408 determine the following: $\min\{\max_i\{d_i/C_i\}\}$. The optimal solution for this problem is thus $d_i/C_i=d_j/C_j$ for any $i, j=1, \ldots, r$. In other words, the amount of processing power that may be allocated by resource allocation process 244 to any of the current tasks is proportional to the size of the data that the task needs to process, in one embodiment. For example, if twice as much intermediate data is assigned to $task_1$ than to $task_2$, $task_1$ may be assigned by resource allocation process 244 to a VM having twice as much computational resources as the VM that executes $task_2$.

VM sizer 408 may, in some cases, match resource devices to the determined VM sizes. For example, VM sizer 408 may determine that a resource device must have a certain amount of processing power and memory available to spawn a VM to process the intermediate data set generated by a $task_j$ and, using computing resource data 404, identify which resource devices satisfy this criteria. In one embodiment, VM sizer 408 stores a set of eligible resource devices in VM configurations 410 for each of tasks, that have the computing resources available to spawn the required VM to execute the task.

In various embodiments, resource allocation process 244 also includes a VM placer 412 configured to determine which resource devices are to execute the VMs associated with VM configurations 410. In one embodiment, resource allocation process 244 utilizes a brute force methodology in which each VM/task combination is evaluated with respect to each resource device in the network. However, the complexity of such an approach is O(n^r), where n is the total number of resource devices and r is the number of tasks to be assigned. In a further embodiment, this problem may be reduced in complexity by VM placer 412 by limiting the resource allocations such that each task runs at a different resource device. Doing so reduces the problem complexity to n*(n−1)* . . . *(n−r+1) candidate solutions to evaluate. In yet another embodiment, VM placer 412 heuristically searches the set of available resource devices to allocate the resource device having the highest bandwidth to process a given task. For example, VM placer 412 may use a greedy search strategy to match intermediate data sets from the previous phase to resource devices for the current phase of processing. In one embodiment, VM placer 412 may rank the intermediate data sizes ($d_{ij}$) to be communicated between phases for $j=1, \ldots, n$ to determine which of $\{task_j\}$ needs to transmit the largest amount of intermediate data to $task_i$. The resource device that executed such a task may be represented as $host_j$. VM placer 412 may then select the resource device having the highest bandwidth to/from $host_j$ that has available resources enough to support the corresponding computing requirements in VM configurations 410, as determined by VM sizer 408. In one embodiment, VM placer 412 applies a filter to the set of possible resource devices, to eliminate those devices having insufficient resources from consideration for placement of a given task. Stated another way, VM placer 412 may assign the largest intermediate data set located on a first resource device to a second resource device, if the second resource device is determined by VM sizer 408 to have sufficient resources to process the intermediate data set and the second resource device also has the highest bandwidth with the first resource device among the resource devices eligible to receive the intermediate data. VM placer 412 may iteratively repeat such a search until each of tasks 1, . . . , r have been assigned to resource devices. In some cases, VM placer 412 may also update VM configurations 410 when a task assignment has been made (e.g., to reflect a change in the available resource devices as a result of a task assignment). Any other search strategy may be used in further embodiments, such as predictive models, statistical models, machine learning techniques, etc.

Figure 5:
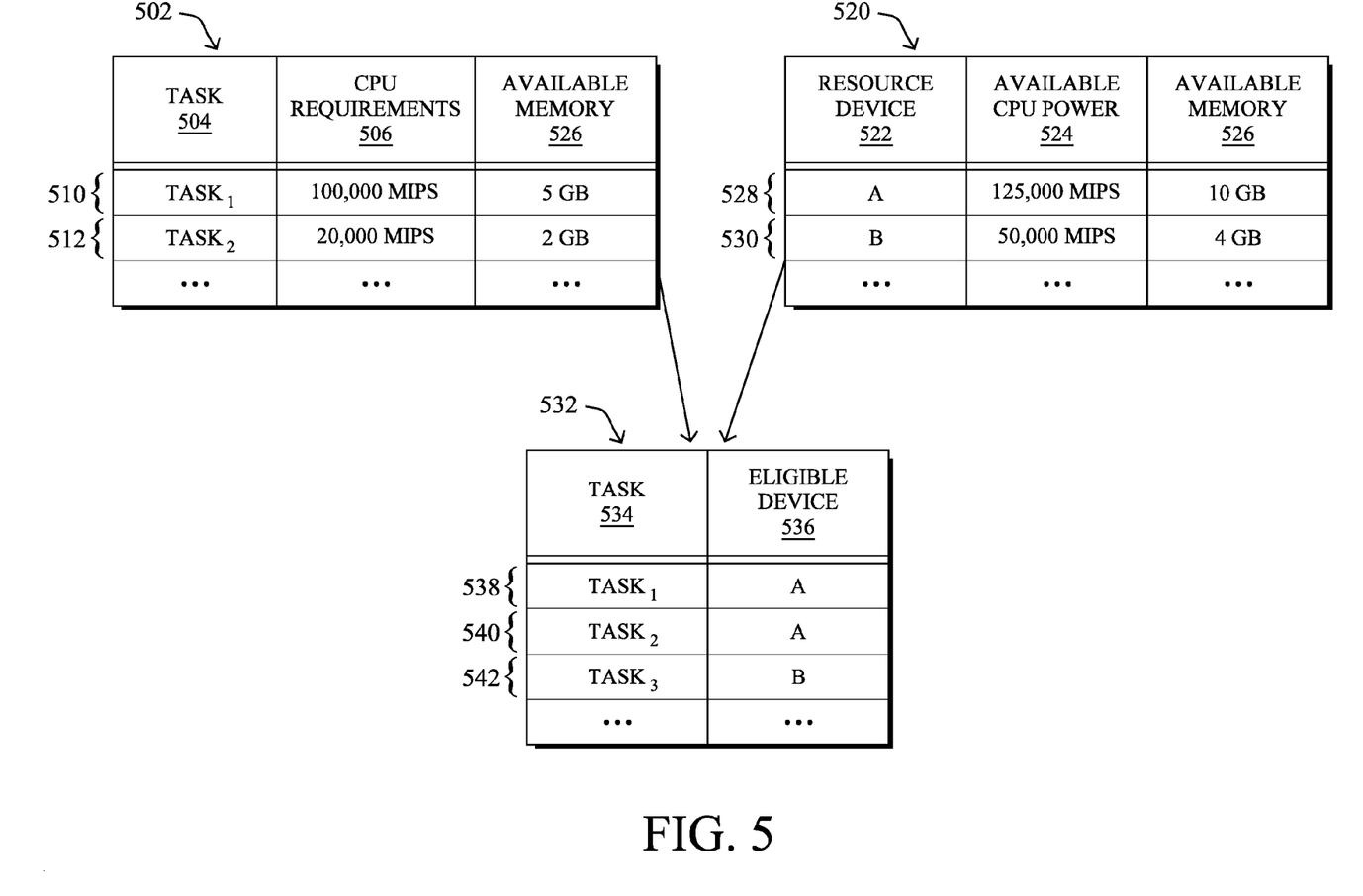
FIG. 5 illustrates an example of eligible resource devices being identified.

Referring now to FIG. 5, an example illustration is shown of eligible resource devices being identified for various tasks. Table 502 is shown to include the VM requirements for the current phase of a multi-phase, distributed computing job. For example, table 502 may be generated by VM sizer 408 and stored in VM configurations 410, as shown in FIG. 4. Table 502 may include a task column 504, which stores a listing of the current tasks to be assigned. Table 502 also includes a CPU requirements column 506, which stores the CPU requirements for the VM that will execute the corresponding task listed in task column 504. Similarly, table 502 may also include a memory requirements column 508, which stores the memory requirements for the VM that will execute the corresponding task listed in task column 504. For example, a first row entry 510 in table 502 may indicate that the VM that will execute $task_1$ of the current phase of processing should be spawned on a resource device having 100,000 million instructions per second (MIPS) of processing power and 5 gigabits (GB) of memory available. Similarly, a second row entry 512 in table 502 may indicate that the VM that will execute $task_2$ of the current phase of processing should be spawned on a resource device having 20,000 MIPS of processing power and 2 GB memory available. In other words, $task_1$ may be determined to require more computing resources than $task_2$, since $task_1$ will process a larger amount of intermediate data than $task_2$. Table 502 may contain any number of entries up to the maximum number of tasks that will be used for the current phase of processing.

Table 520 is shown to include data regarding the computing resources available at the various resource devices in the cloud computing environment. For example, table 520 may correspond to computing resource data 404 received by resource allocation process 244, as shown in FIG. 4. Table 520 may include a device column 522 that identifies the particular resource device in the cloud computing environment. Table 520 may also include an available CPU power column 524, which stores the available amount of CPU power for the corresponding resource device in column 522. Similarly, table 520 may include an available memory column 526 that stores the available amount of memory on the corresponding resource device in column 522. For example, table 520 may include a first row entry 528 that signifies that resource device A has 125,000 MIPS and 10 GB of memory available and a second row entry 530 that signifies that resource device B has 50,000 MIPS and 4 GB of memory available.

In one embodiment, the entries in table 502 may be matched to those of table 520 (e.g., by resource allocation process 244). The results of the match may then be stored in a table 532 (e.g., as part of VM configurations 410). Table 532 may include a task column 534 that relates a particular task to an eligible resource device in device column 536. For example, row entry 538 may signify that resource device A is eligible to run the VM that executes $task_1$, since resource row entry 528 in table 520 satisfies the VM requirements for $task_1$ indicated in row entry 510 of table 502. Similarly, row entries 540 and 542 of table 532 may indicate that both resource devices A and B are eligible to run the VM that executes $task_2$.

One skilled in the art will appreciate that the process and data structures described in FIG. 5 is merely one possible way to determine resource device eligibility and that other data structures and values may be used in alternate embodiments. For example, different measures of computing resources may be used, different tasks may be matched to resource devices at different times, only one task may be matched to a particular resource device, etc.

Figure 6:
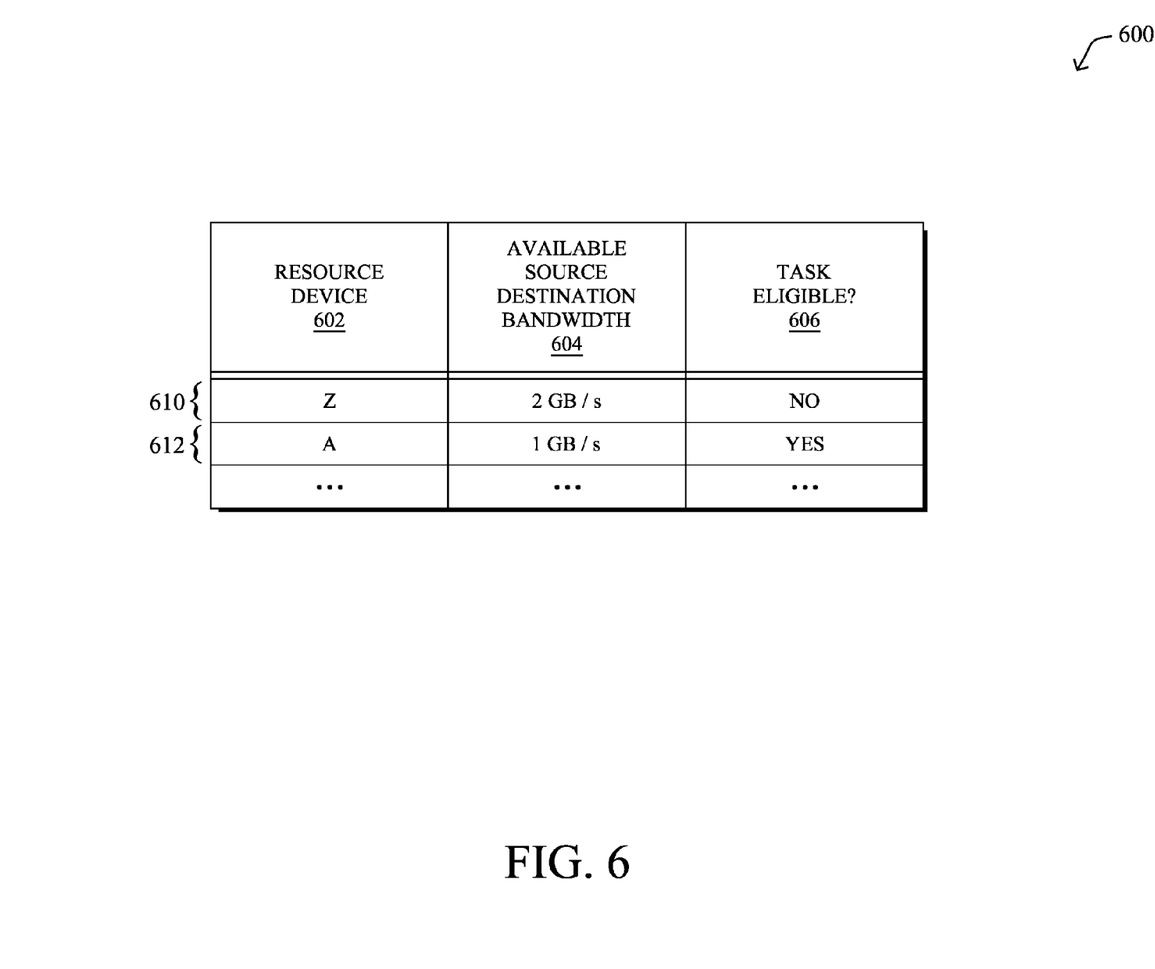
FIG. 6 illustrates an example of a task being assigned to a resource device.

Referring now to FIG. 6, an illustration is shown of a task being assigned to a resource device, according to one embodiment. As shown, a table 600 may generally store network resource data associated with the resource devices in the cloud computing environment. For example, table 600 may include network resource data 406 received by resource allocation process 244, as depicted in FIG. 4. Table 600 may include a device column 602 in which resource devices in the cloud environment are listed. Table 600 may also include an available bandwidth column 604 that indicates the available bandwidth between a device in column 602 and the one or more devices that may provide intermediate data to the resource device as part of the current phase of processing of the computing job. For example, assume that the placement of the VM to execute $task_1$ is being evaluated and that $task_1$ will receive intermediate data from resource device D. In such a case, column 604 may include the network bandwidth available between resource device D and the resource devices listed in device column 602. In one embodiment, table 600 may include a column 606 that indicates whether the resource device in column 602 is eligible to execute a given task (e.g., whether the resource device has been determined to have the computing resources to run the corresponding VM). For example, table 600 may have a row entry 610 that indicates that resource device Z and resource device D share a 2 GB/s network connection, but that resource device Z does not have the computing resources available to execute $task_1$. Similarly, table 600 may include row entry 612 that indices that resource devices A and D share a 1 GB/s network connection and that resource device A has the computing resources available to meet the determined VM requirements for $task_1$.

In one embodiment, table 600 may be sorted by column 604, i.e., by the bandwidths between the source and destination resource devices. A heuristic search may then be employed to assign tasks to resource devices. For example, assume that $task_1$ will receive the largest amount of intermediate data for processing. In such a case, table 600 may be searched starting at row entry 610 until an eligible resource device having the highest bandwidth with the source of the intermediate data is found. For example, row entry 610 may be evaluated and resource device Z may be passed over for $task_1$, since it does not have enough computing resources available to meet the VM requirements for $task_1$. In another embodiment, entry 610 may be pre-filtered from inclusion in table 600 based on resource device Z being ineligible to execute $task_1$ (e.g., table 600 may be a join table, etc.). In yet another embodiment, the eligibility of a given resource device may be assessed after the device is first selected from table 600. For example, the VM for $task_1$ may be tentatively assigned to resource device Z, the eligibility of resource device Z may be assessed, resource device Z deemed ineligible, and processing of table 600 continues along to match $task_1$ to a resource device. As shown, the VM that will execute $task_1$ is assigned to resource device A, since resource device A has the highest bandwidth to/from the device on which the intermediate data to be processed by $task_1$ resides and resource device A has the computing resources to meet the determined VM requirements for $task_1$. Processing may then continue in this manner to evaluate the task having the second largest amount of intermediate data to be processed until each VM/task has been assigned to a resource device.

Figure 7:
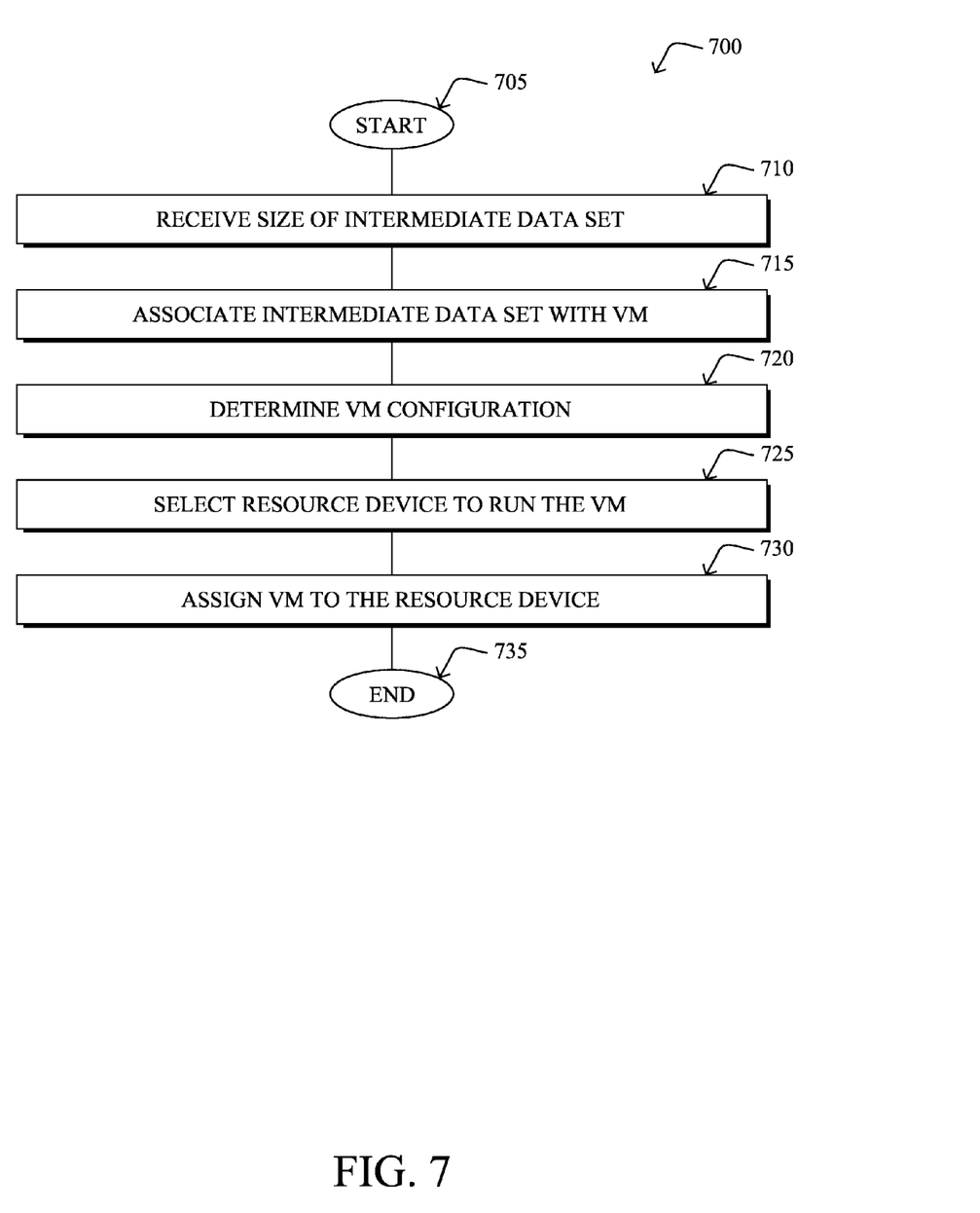
FIG. 7 illustrates an example simplified procedure for allocating resources to process an intermediate data set.

FIG. 7 illustrates an example simplified procedure for allocating resources to process an intermediate data set in a multi-phase, distributed computing job, in accordance with one or more embodiments described herein. The procedure 700 may start at step 705, and continue to step 710, where, as described in greater detail above, data indicative of the size of an intermediate data set generated by a task in a first phase of processing is received (e.g., by resource allocation process 244). For instance, resource allocation process 244 may receive size data 402 from the resource devices that generate intermediate data in the multi-phase process, such as the memory space used by an intermediate data set, the number of key-value pairs in an intermediate data set (e.g., if the multi-phase process is a MapReduce or similar process), or any other indication of the amount of data generated in the previous phase.

A VM is associated with the received intermediate data set in step 715 to process the intermediate data in the current phase of the process. For example, as discussed above, a VM may be spawned or otherwise assigned on one of the resource devices in the network to execute the task that will process the intermediate data in the current phase. In some cases, multiple intermediate data sets may be assigned to the same VM/task, such as when different numbers of tasks are used in different phases.

At step 720, a configuration is determined for the VM. The VM configuration is may correspond to the amount of computing resources that the VM associated with the received intermediate data set should be allocated. For example, the VM configuration may include processing and/or memory requirements for the VM. In one embodiment, the VM configuration may be determined such that the overall processing time by the tasks/VMs in the current phase is minimized. In other words, the amount of computing resources for a given VM may be a function of the amount of intermediate data to be processed by the VM (e.g., more resources may be allocated to a VM handling a larger amount of intermediate data, so that all VMs in the current phase complete their respective tasks at or around the same time).

A resource device is then selected to run the VM, at step 725. As noted above, the resource device may be selected based on its associated computing and network resources, in various embodiments. For example, a resource device may be selected to run the VM only if the resource device has sufficient computing resources to satisfy the VM configuration determined in step 720. In further embodiments, the resource device may be selected based in part on the bandwidth between the resource device and the resource device from which it receives the intermediate data to process. For example, an eligible resource device (e.g., a resource device having available computing resources to handle the VM configuration determined in step 720) that also has the highest available bandwidth with the device sending the intermediate data set. In some embodiments, resource devices may be assigned iteratively to VMs such that the resource device that will receive the largest amount of intermediate data also has the highest bandwidth with the sending device, etc.).

In step 730, the VM is assigned to the resource device to process the intermediate data set. In other words, the VM may be spawned on the selected resource device to execute the task that processes the intermediate data. Thus, one or more notification may be sent to the VM that generated the intermediate data set and/or to the resource device at which the intermediate data set will be processed. Procedure 700 then ends at step 735 or may be repeated any number of times across different phases of a multi-phase, distributed computing process.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the dynamic allocation of resources to process intermediate data in a multi-phase, distributed computing process. In particular, the techniques herein allow for more optimization values to be used by a task scheduler, thereby increasing the freedom of the scheduling decision and reducing the overall job completion time. In addition, dynamically determining the appropriate VM size based on the amount of processing that needs to be done by the VM reduces the impact of un-balanced intermediate results on the total job completion time. Further, the techniques described herein also allow for the least variance in phase completion time, given a fixed resource budget (i.e., the amount of computing resources that may be used in each phase).

While there have been shown and described illustrative embodiments that provide for dynamic allocating resources to process intermediate data sets in a multi-phase process, it is to be understood that various other adaptations and modifications may be made within the spirit and scope of the embodiments herein. For example, the embodiments herein have been shown and described primarily with respect to a MapReduce process. However, the embodiments in their broader sense are not as limited, and may, in fact, be used with other types of distributed computing processes that perform tasks in multiple phases. The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a computing device, data indicative of the size of an intermediate data set generated by a first resource device;
    associating the intermediate data set with a virtual machine to process the intermediate data set;
    determining a virtual machine configuration based on the size of the intermediate data set;
    selecting a second resource device to execute the virtual machine based on the virtual machine configuration and on an available bandwidth between the first and second resource devices; and
    assigning the virtual machine to the second resource device to process the intermediate data set, wherein the intermediate data set is generated by a mapper task executed within a virtual machine on the first resource device and the virtual machine assigned to the second resource device executes a reducer task to process the intermediate data set.

2. The method of claim 1, wherein determining the virtual machine configuration comprises:

determining, for each of a plurality of virtual machines, a virtual machine configuration such that the maximum computation time taken by any of the virtual machines in the plurality to process an intermediate data set is minimized.

3. The method of claim 2, wherein a maximum number of virtual machines in the plurality is limited by a preset parameter.

4. The method of claim 1, wherein the intermediate data set comprises one or more key/value pairs.

5. The method of claim 1, wherein the virtual machine configuration comprises at least one of a memory size or a processor speed.

6. The method of claim 1, further comprising:
receiving, at the device, an input data set; and
allocating a portion of the input data set to the first resource device to generate the intermediate data set.

7. The method of claim 1, wherein selecting the second resource device to execute the virtual machine comprises:
heuristically searching a set of resource devices eligible to process one or more intermediate data sets for a resource device having enough available resources to support the virtual machine configuration; and
identifying the second resource device as having enough available resources to support the virtual machine configuration.

8. The method of claim 1, wherein selecting the second resource device to execute the virtual machine comprises:
identifying the intermediate data set as the largest intermediate data set generated by one of a plurality of resource devices;
searching a set of resource devices eligible to process one or more intermediate data sets for a resource device having the highest bandwidth; and
identifying the second resource device as the resource device having the highest bandwidth among the set of resource devices eligible to process one or more intermediate data sets.

9. An apparatus comprising:
one or more network interfaces configured to communicate in a computer network;
a processor configured to execute one or more processes; and
a memory configured to store a process executable by the processor, the process when executed operable to:
receive data indicative of the size of an intermediate data set generated by a first resource device;
associate the intermediate data set with a virtual machine to process the intermediate data set;
determine a virtual machine configuration for processing a next computational phase of the intermediate data set based on the size of the intermediate data set;
select a second resource device to execute the virtual machine based on the virtual machine configuration and on an available bandwidth between the first and second resource devices; and
assign the virtual machine to the second resource device to process the intermediate data set, wherein the intermediate data set is generated by a mapper task executed within a virtual machine on the first resource device and the virtual machine assigned to the second resource device executes a reducer task to process the intermediate data set.

10. The apparatus of claim 9, wherein the process, when executed, is further operable to:
determine, for each of a plurality of virtual machines, a virtual machine configuration such that the maximum computation time taken by any of the virtual machines in the plurality to process an intermediate data set is minimized.

11. The apparatus of claim 10, wherein a maximum number of virtual machines in the plurality is limited by a preset parameter.

12. The apparatus of claim 9, wherein the intermediate data set comprises a key/value pair.

13. The apparatus of claim 9, wherein the virtual machine configuration comprises at least one of a memory size or a processor speed.

14. The apparatus of claim 9, wherein the process, when executed, is further operable to:
heuristically search a set of resource devices eligible to process one or more intermediate data sets for a resource device having enough available resources to support the virtual machine configuration; and
identify the second resource device as having enough available resources to support the virtual machine configuration.

15. The apparatus of claim 9, wherein the process, when executed, is further operable to: identify the intermediate data set as the largest intermediate data set generated by one of a plurality of resource devices;
search a set of resource devices eligible to process one or more intermediate data sets for a resource device having the highest bandwidth; and
identify the second resource device as the resource device having the highest bandwidth among the set of resource devices eligible to process one or more intermediate data sets.

16. A tangible, non-transitory, computer-readable media medium having software encoded thereon, the software, when executed by a processor, operable to:
receive data indicative of the size of an intermediate data set generated by a first resource device;
associate the intermediate data set with a virtual machine to process the intermediate data set;
determine a virtual machine configuration for processing a next computational phase of the intermediate data set based on the size of the intermediate data set;
select a second resource device to execute the virtual machine based on the virtual machine configuration and on an available bandwidth between the first and second resource devices; and
assign the virtual machine to the second resource device to process the intermediate data set wherein the intermediate data set is generated by a mapper task executed within a virtual machine on the first resource device and the virtual machine assigned to the second resource device executes a reducer task to process the intermediate data set.

* * * * *

UNITED STATES PATENT AND TRADEMARK OFFICE
CERTIFICATE OF CORRECTION

PATENT NO. : 9,489,225 B2  
APPLICATION NO. : 14/156149  
DATED : November 8, 2016  
INVENTOR(S) : Senhua Huang et al.

Page 1 of 1

It is certified that error appears in the above-identified patent and that said Letters Patent is hereby corrected as shown below:

In the Specification

In Column 6, Line 57, please amend as shown:  
executed by n-number of VMs (e.g., a first VM 304

In Column 7, Line 34, please amend as shown:  
words, resource allocation in process 244 may make reducer In Column 10, Line 13, please amend as shown:  
configurations 410 for each of tasks$_i$, that have the computing In Column 13, Line 21, please amend as shown:  
The VM configuration may correspond to the amount of Signed and Sealed this  
Nineteenth Day of January, 2021

Andrei Iancu  
*Director of the United States Patent and Trademark Office*